Dec. 6, 1960  R. B. VAN CLEVE  2,962,864
AUTOMATIC TRANSMISSION
Filed May 31, 1956  8 Sheets-Sheet 1

INVENTOR.
REYNOLDS BARTON VAN CLEVE
BY
Charles L. Lovercheck
attorney

INVENTOR.
REYNOLDS BARTON VAN CLEVE

Dec. 6, 1960   R. B. VAN CLEVE   2,962,864
AUTOMATIC TRANSMISSION
Filed May 31, 1956   8 Sheets-Sheet 5

INVENTOR.
REYNOLDS BARTON VAN CLEVE
BY
Charles L. Lovercheck
Attorney

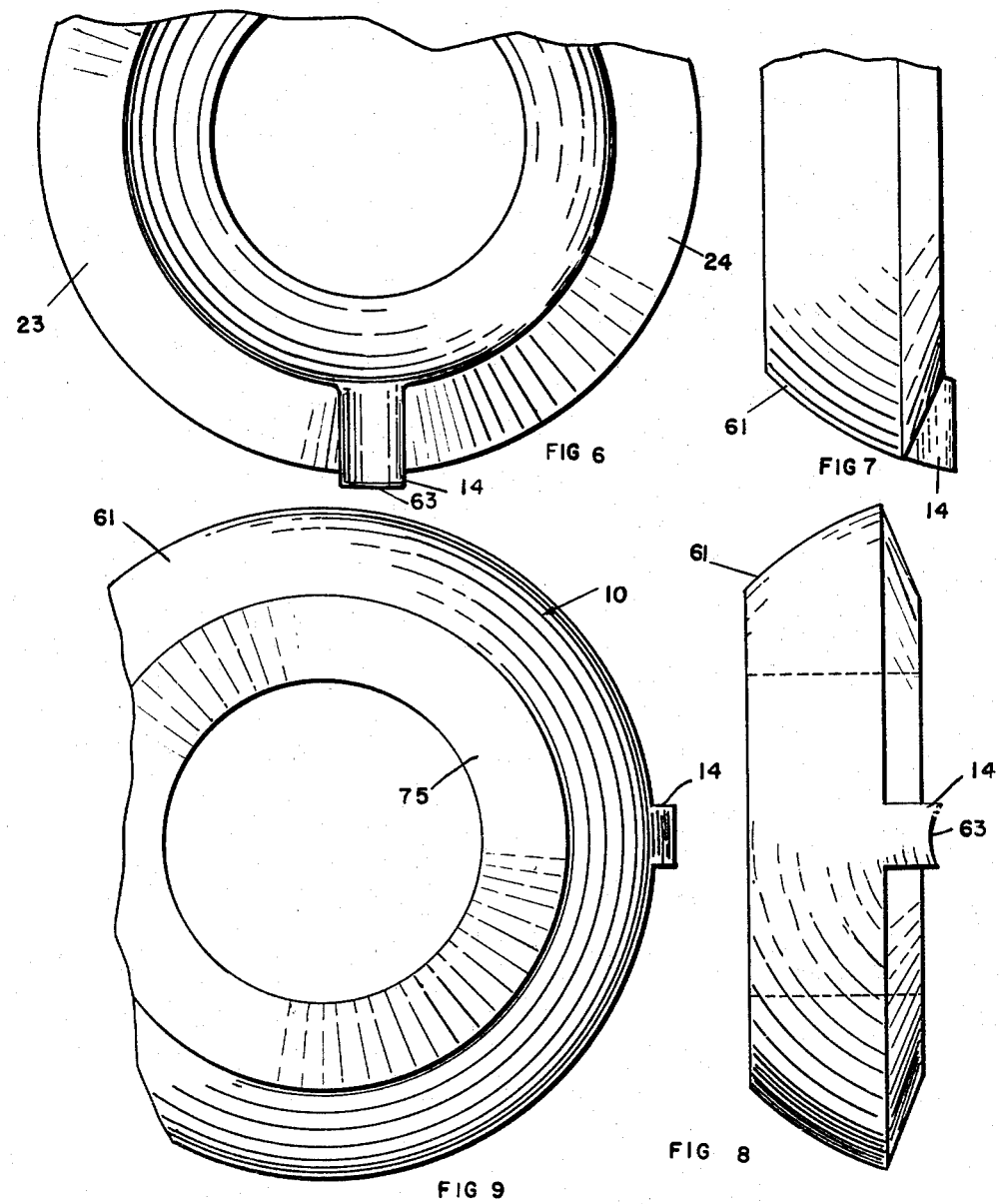

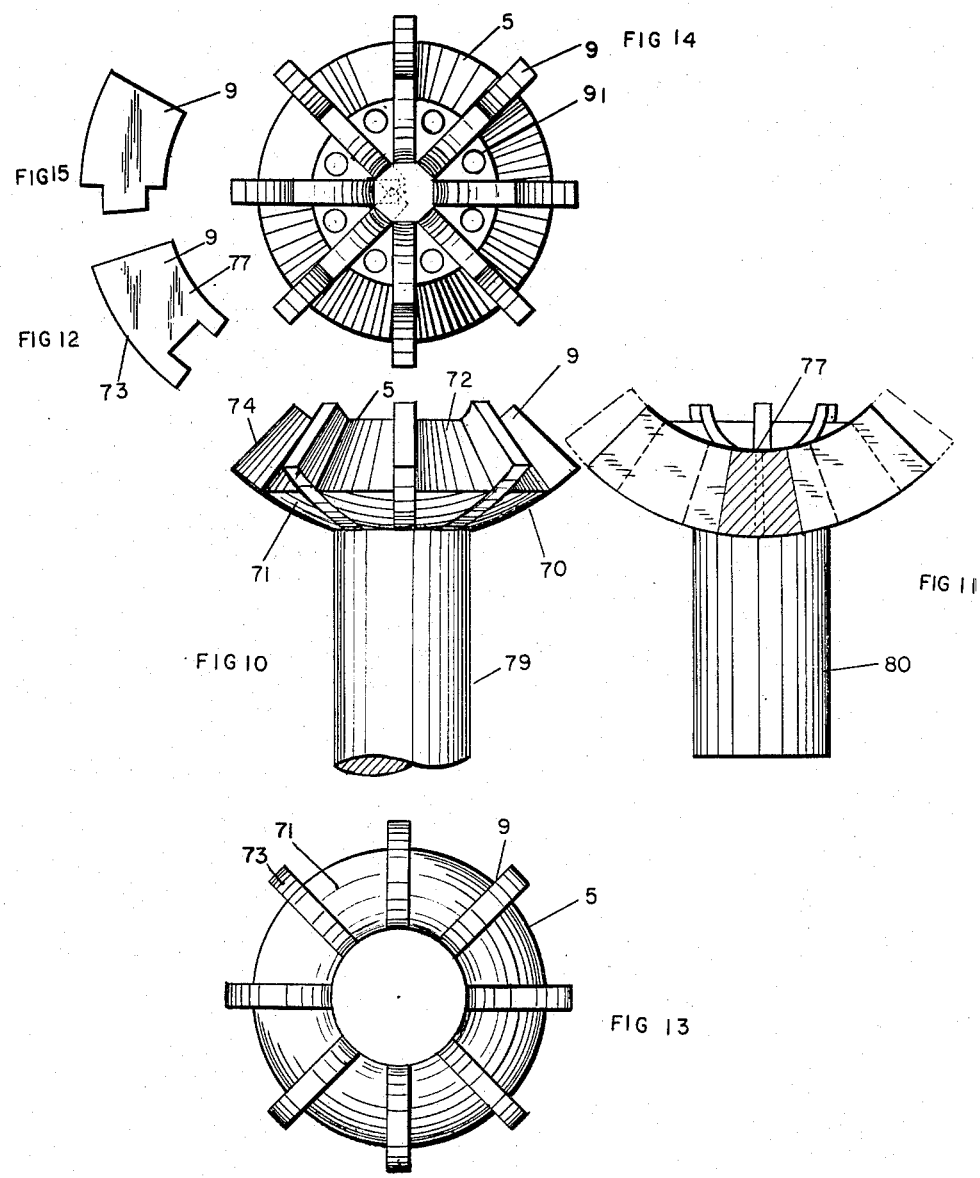

Dec. 6, 1960    R. B. VAN CLEVE    2,962,864
AUTOMATIC TRANSMISSION

Filed May 31, 1956    8 Sheets-Sheet 8

INVENTOR.
REYNOLDS BARTON
VAN CLEVE
BY
Charles Lovercheck
Attorney

United States Patent Office 2,962,864
Patented Dec. 6, 1960

2,962,864

AUTOMATIC TRANSMISSION

Reynolds Barton Van Cleve, Millcreek Township, Erie County, Pa. (6391 Sterrettania Road, Fairview, Pa.)

Filed May 31, 1956, Ser. No. 588,518

3 Claims. (Cl. 60—53)

This invention relates to transmission devices for transmitting power from a prime mover to a load.

Automatic transmissions which have been made according to previous designs have generally been intricate in construction and expensive to build. Further, prior transmissions have usually been subject to malfunction because of the complexities of the components which make up the transmissions.

In carrying out the present invention, a variable positive displacement hydraulic pump is provided for driving a variable positive displacement hydraulic motor. The system has, in combination therewith, a control system which automatically controls the displacement of the motor and the pump. Control of direction of rotation of the motor is, of course, manual.

Both pump and motor are a variation of the rotary sliding vane type and the direction of flow and displacement of the pump are controlled by shifting the position of a pump chamber ring within the pump enclosure. A similar chamber ring controls the displacement of the motor. The chamber ring which controls the displacement of the pump varies the eccentricity of the path of the tips of the rotor blades. The position and relative eccentricity of the pump chamber ring control the direction and degree of rotation of the motor rotor relative to the rotation of the pump rotor and make possible an infinite number of speed ratios of pump to motor within practical design limits of the pump. In the transmission disclosed, the inside surface of the outer casing of pump and motor, as well as the outer surfaces of both pump and motor stators and the outer and inner surfaces of both pump and motor rotors and the outer and inner surfaces of the chamber rings, is a segment of the surface of a sphere.

It is, accordingly, an object of this invention to overcome the disadvantages in prior transmissions and, more particularly, it is an object of this invention to provide a transmission which is simple in construction, economical to manufacture, and simple and efficient in operation.

Another object of this invention is to provide a hydraulic transmission which has component parts thereof defining sections of concentric spheres, thus providing (cet. par.) universal interaction of the components.

A further object of the invention is to provide in a hydraulic transmission a control system which will provide automatic shifting of the components to produce various logical or desired displacement ratios between the pump and motor.

A still further object of the invention is to provide a unique type of pump in a transmission.

Still another object of the invention is to provide a unique pump and motor combination in a hydraulic transmission.

Yet another object of the invention is to provide a pump and motor system in combination with an improved control system for controlling the direction and ratio of rotation of the motor relative to the pump rotor in a hydraulic transmission.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 6 is a rear view of the pump chamber ring according to the invention;

Fig. 7 is a top view of the chamber ring;

Fig. 8 is a side view of the chamber ring shown in Figs. 6 and 7;

Fig. 9 is a front view of the pump chamber ring;

Fig. 10 is a side view of the pump rotor according to the invention;

Fig. 11 is a cross sectional view of the rotor;

Fig. 12 is a side view of one of the blades according to the invention;

Fig. 13 is a front view of the pump rotor;

Fig. 14 is a rear view of the pump rotor;

Fig. 15 is a side view of a blade; Fig. 16 is a view of the bypass.

Figure 1:
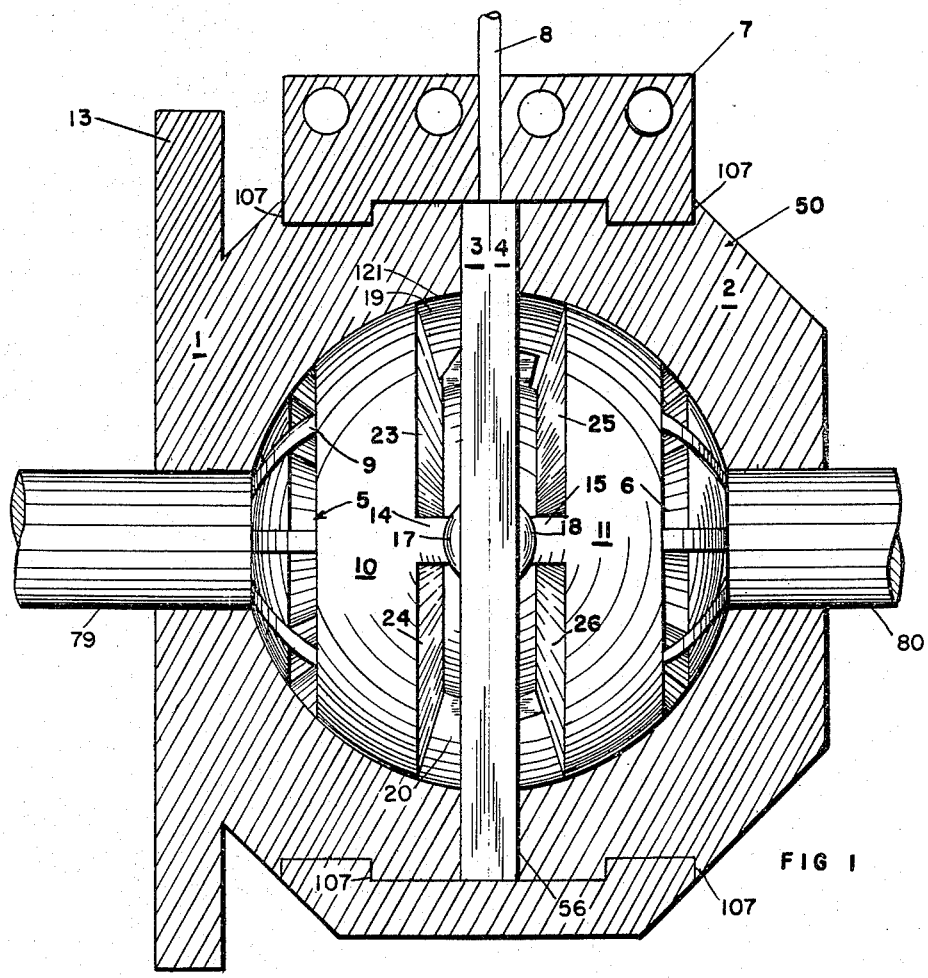
Fig. 1 is a side view of a transmission according to the invention with the two housing sections in cross section.
Figure 2:
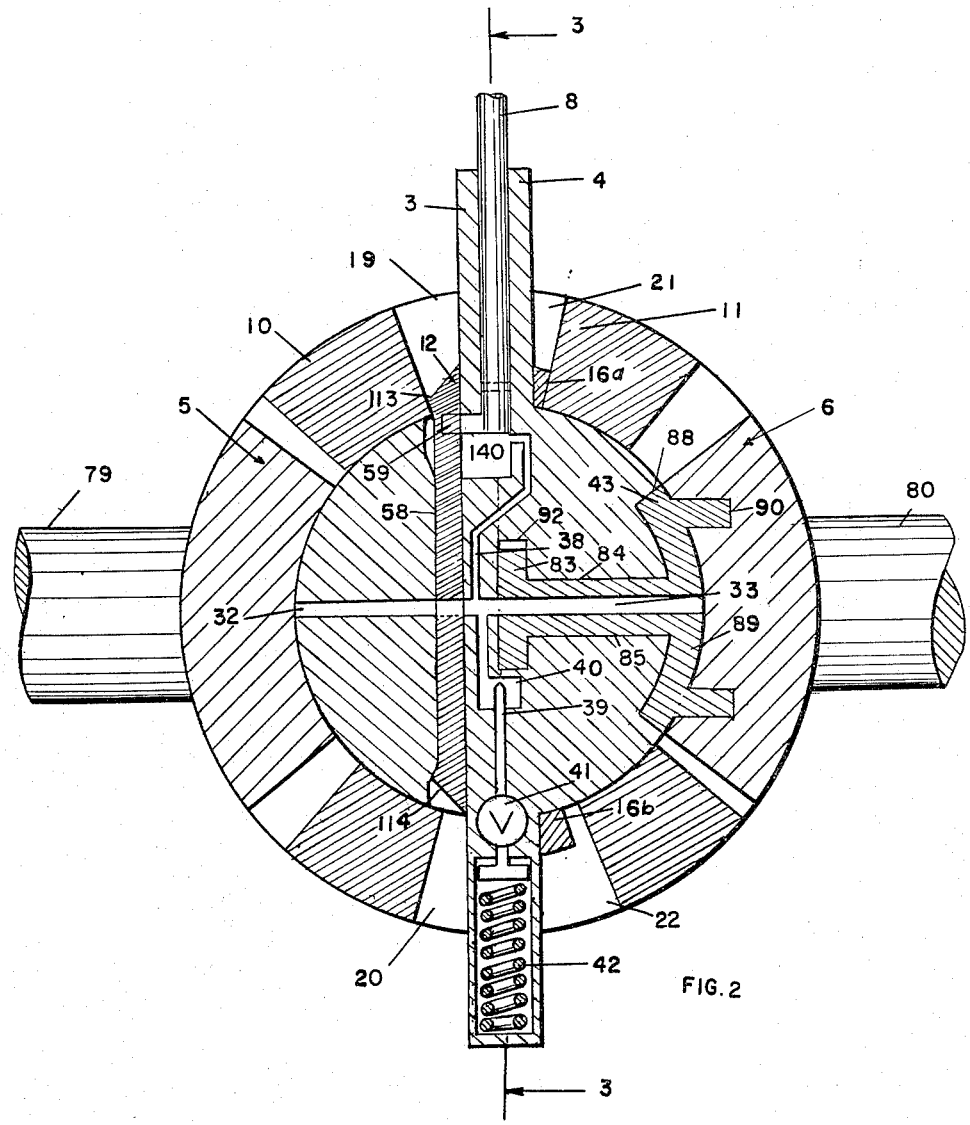
Fig. 2 is a cross sectional view taken on line 2—2 of Fig. 3 of the transmission shown in Fig. 1.
Figure 3:
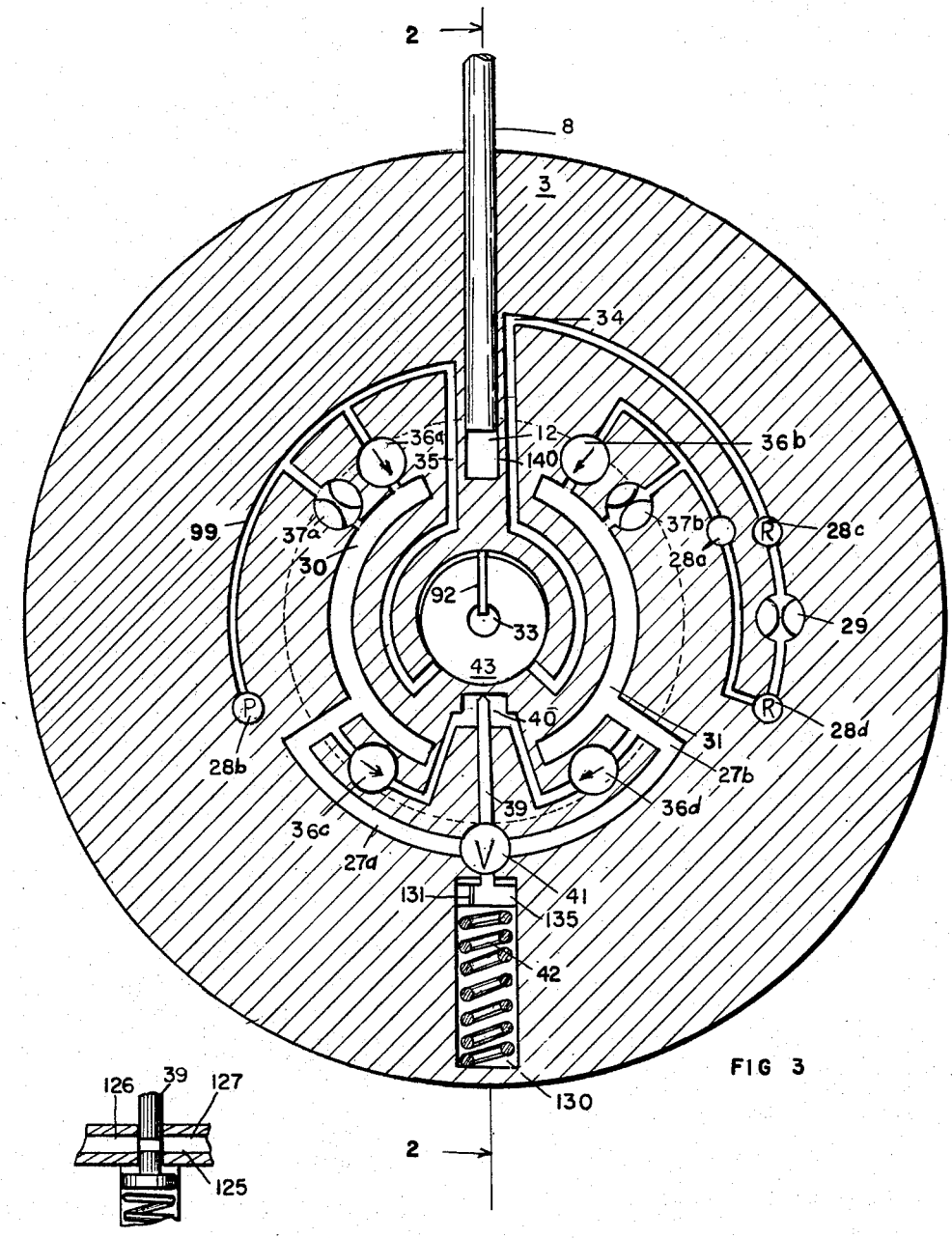
Fig. 3 is a cross sectional view taken on line 3—3 of Fig. 2.
Figure 4:
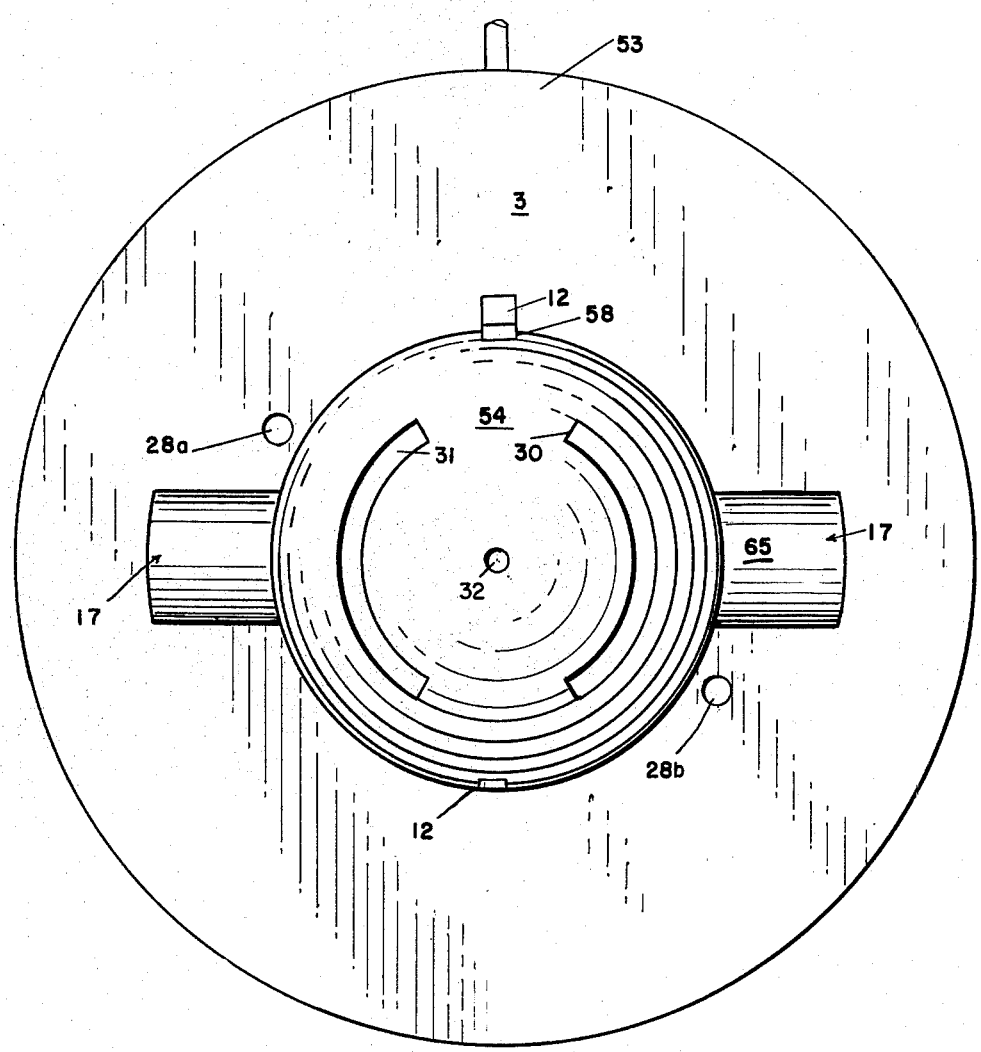
Fig. 4 is a front view of the central sphere and center plate comprising part of the invention.
Figure 5:
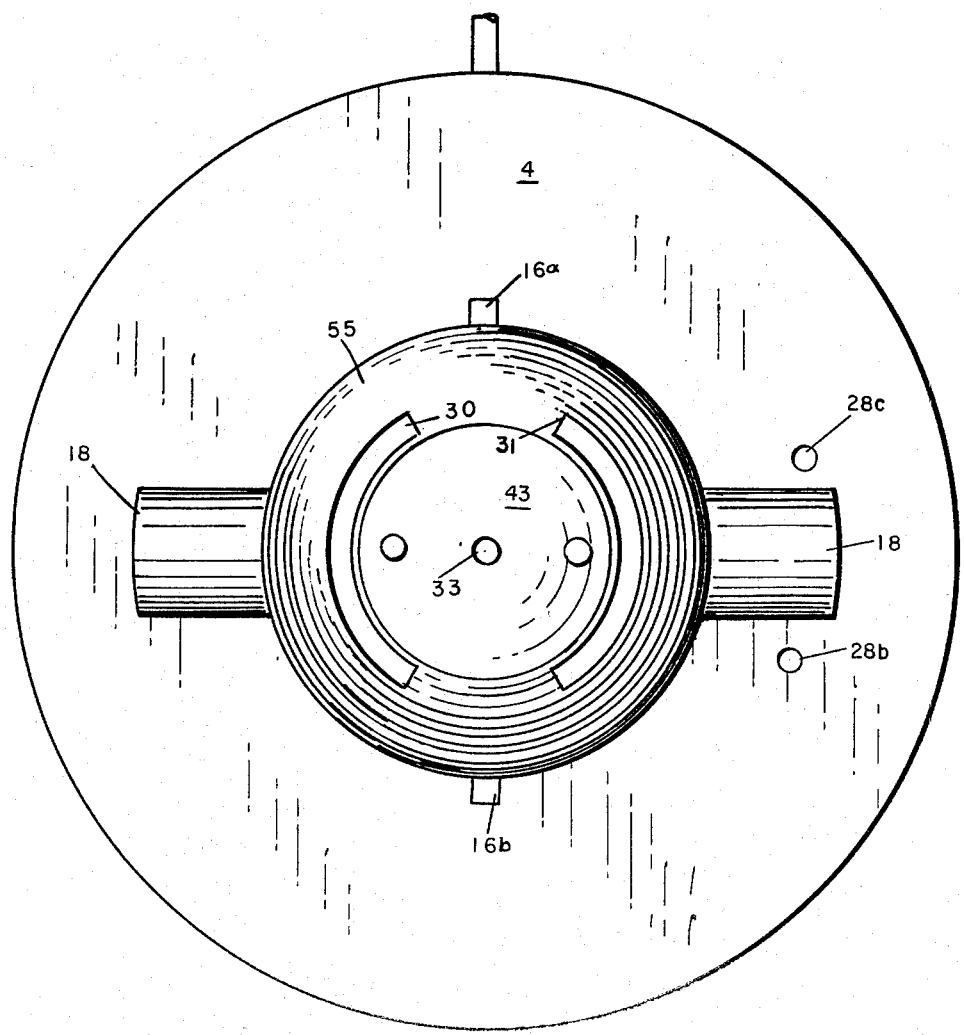
Fig. 5 is a rear view of the central sphere and center plate shown in Fig. 4.

The transmission is made up of the following main components:

(1) The housing made up of a pump housing section 1 and a motor housing section 2.

(2) The center plate and included valves, orifices, passages, etc.

(3) The pump and motor rotors.

(4) The pump and motor stators and included passages.

(5) A pump chamber ring 10 and a motor chamber ring 11.

(6) A metering pump 43.

(7) A bypass valve 41.

NOTE.—The explanation herein presumes that the pump rotor is to rotate clockwise when viewed from the rear.

*Housing*

The housing is made up of the front housing section 1 and the rear housing section 2. The front housing section 1 is bored to receive a pump rotor shaft 79 and the rear housing section 2 is bored to receive a motor rotor shaft 80. The two housing sections 1 and 2 are hollow and the inside surfaces of both sections 1 and 2 conform in curvature to a portion of the surface of a sphere. The housing sections 1 and 2 are held together by a clamp 7 which engages peripheral grooves 107 on the housing sections 1 and 2. A mounting flange 13 is provided integral with the housing section 1. The front housing section 1 and the rear housing section 2 each defines one-half of two halves of a spherical cavity and define a pump chamber and a motor chamber, the halves of the cavity being separated by a center plate 56.

*Stator*

The stator is made up of the center plate 56 having hemisphere shaped stator elements 54 and 55 attached to the front and rear thereof, respectively. The center plate 56 is preferably made up of a front portion 3 and a rear portion 4. The pump side of the center plate 56 has the hemisphere shaped stator element 54 integral therewith and disposed at the center thereof. The motor side of the plate 56 has the hemisphere stator 55 integral therewith and disposed at the center thereof.

When the center plate 56 is clamped in position between the housing sections 1 and 2 as shown in Fig. 1, the hemisphere shaped stator elements 54 and 55 are concentric with the hemispherical inside surface of the housing. A bore 32 is formed through the pump stator 54 and a bore 33 is formed through the reactor stator 55 to supply fluid from a manifold chamber 40 to the space behind the rotor blades to hold them outwardly against the chamber rings.

Front center plate pivot ribs 17 are integral with the sides of the stator and the center plate 56 and are in the form of cylinders split longitudinally. The ribs 17 have their cylindrical surfaces extending forward from the plate 56 to form a pivot surface upon which concave surfaced bosses 14 on the chamber ring slide. The crescent shaped openings comprising right main channel 31 and left main channel 30 extend through the stator and both communicate with the space between the pump and motor vanes and working surfaces 75 of the chamber rings. A vent 28a communicates with an upper pump control chamber 19. A vent 28b communicates with a lower pump control chamber 20. The upper and lower pump control chambers 19 and 20 are defined by the front center plate 3, the inner surface of the housing, the outer surface of the pump stator element 54, control surfaces 23 and 24 of the pump chamber ring, and chamber ring pivot ribs 14. The upper and lower pump control chambers 19 and 20 are separated by the pump chamber pivot ribs or bosses 14 and the chamber ring pivot ribs 17 which are carried thereby. An upper motor control chamber 21 and a lower motor control chamber 22 are similar to the pump control chambers 19 and 20 except, in the motor control chambers, an upper motor ring stop 16a is integral with the center plate 56 and stator and a lower motor ring stop 16b is integral therewith at the bottom which maintains the motor chamber ring in a tilted position relative to the motor shaft and insures that the motor chamber ring will always have a tilt with regard to the motor shaft. If the ring could move to a position of no inclination or could reverse its inclination when under load, stresses of high value would result.

Rotors

The pump rotor and the motor rotor are identical with the exception that the motor rotor has the metering pump assembly 43 attached thereto; however, holes 91 are formed in the pump rotor also so that it can be interchanged with the motor rotor.

Rotor 5 has spaced slots 70 disposed around the periphery thereof and the slots 70 receive vanes 9. The rotor body has an outside surface 71 which conforms to the inner periphery of the spherical housing and an inwardly tapering surface 72 which conforms to the shape of a frustum of a cone having its apex at the center of the spheres. The vanes 9 have a curved outside surface 73 which has the same radius of curvature as the surface 71. An end surface 74 is flat. When the rotor is assembled, the surface 74 engages the working surface 75 of a ring 10. The vanes 9 are disposed in spaced slots on the rotor body and each vane 9 has an inner curved surface 77 which conforms to the radius of curvature of the stator hemisphere 54.

Chamber rings

The pump chamber ring and the motor chamber ring are identical and, therefore, only the chamber ring 10 is shown in Figs. 6 to 9. The outer periphery 61 of the chamber ring 10 conforms to a spherical inner surface 121 of the housing. The upper and lower chamber ring control surfaces 23 and 24 facing the inner plate 3 are bevelled and conform to the shape of the frustum of a cone.

Integral with the control surfaces 23 and 24 are the pump chamber ring pivot bosses 14 and motor chamber ring pivot bosses 15. The pivot boss 14 has a concave surface 63 on the distal end thereof which is adapted to rotate about the front center plate pivot rib 17. The corresponding concave surface on the motor chamber ring pivot rib 18 is adapted to rotate around the motor chamber pivot boss 15.

Metering pump

The purpose of the metering pump 43 is to provide a means of conveying to the control system a factor which is exactly proportional to the speed of the load; that is, to provide a positive flow in and out of the several control chambers which varies directly as the rotational speed of the load.

Since the speed of rotation of the metering pump 43 is exactly equal to the speed of rotation of the motor rotor 6, the metering pump 43 will induce in the control system a flow which is proportional in magnitude to the speed of rotation of the motor rotor 6, which factor of flow, together with the factor of applied pressure (motive torque as determined in part by engine throttle setting), induces the automatic changing of speed ratios between the pump and the motor.

The metering pump 43 is a relatively small rotary sliding vane type pump and is made up of a shaft 84 which is attached to a flange 89. The flange 89 freely rotates in a counterbore 88 in the hemisphere stator 55. The flange 89 has pins 90 attached thereto and extending axially therefrom which engage bores 91 in the motor rotor. The bore 33 is formed in the shaft 84 of the metering pump 43 to conduct fluid under pressure from the channel 30 or 31 to the space behind the rotor blades to urge the blades outwardly into engagement with the surface 75 of the chamber ring 10.

The metering pump 43 has a rotor 83 thereon which rotates in a cylindrical chamber in the plate 4 slightly eccentric to the axis of the metering pump rotor. The rotor 83 has one or more radially extending blades 92 which have sliding contact with the metering pump chamber surface.

Primary circuit

The primary circuit consists of the two crescent shaped channels 30 and 31 which are (geometrically) straight arc surface segments on opposite sides of a theoretical cylinder which is coaxial with the axes of the pump and motor shafts, which pass through the stators; that is, through the spherical parts and the center plate sections from the pump chamber to the motor chamber, and complete the primary circuit of fluid from the pump to the motor and back to the pump. Both the pump and motor can be visualized as a simple radial vane type pump wherein the vanes, rotor, and casing have been warped so that the vane tips are restrained to move in a path eccentric to the axis and concave with respect thereto.

With respect to the control of the output of the pump, if the chamber ring is tilted downwardly and the rotor is rotating clockwise viewing it from the rear, the left main channel 30 will be the pressure side of the system since under these conditions, the bottom of the rotor at any instant displaces more fluid than the top and the bottom of the rotor is forcing fluid into the left main channel 30 whereas the top of the rotor is removing it. In the motor the chamber ring is tilted permanently upward, causing greater displacement at the top of the motor rotor than at the bottom. Thus, the motor rotor will rotate clockwise when pressure is delivered thereto from the left main channel 30. In addition, when the transmission is shifted to forward, the left main channel 30 is the pressure side of the primary system except that, in deceleration when the load or motor shaft has a driving force thereon, the right main channel 31 becomes the pressure side since under these conditions the rear wheels of the vehicle, hence, the motor, drive the pump. When the pump chamber ring is shifted to slightly incline up, the transmission will be in reverse and the right main channel 31 becomes the pressure side except when the load is decelerating in which case the left main channel 30 becomes the pressure side.

*Bypass*

The purpose of the bypass system is to provide a relief of the strain on the engine and the transmission in over coming the static inertia of the load on the motor when it is starting from rest and, in this respect, to eliminate the need for a conventional friction clutch and/or fluid coupling. Since the transmission ordinarily would be used with an internal combustion engine which, by its nature, is nearly impossible to start from rest under full load, the bypass is provided. This bypass feature could be eliminated if provision for clutching of the prime mover to the pump shaft or of the motor shaft to the load were provided.

In order for the prime mover or engine to start the motor smoothly when loaded, the left main channel 30 and the right main channel 31 are connected by a left bypass passage 27a, the bypass valve 41, and a right bypass passage 27b. Fluid flows from the left bypass passage 27a through a check valve 36c into the manifold chamber 40 when the left main channel 30 is the pressure side. This will exert a force on the end of a pressure plunger 39 and cause the pressure plunger 39 to move an orifice 125 out of alignment with channels 126 and 127 (Fig. 16). Once the pump rotor has started to rotate and sufficient pressure is built up in the manifold chamber 40 to move the plunger 39, the flow of fluid will be restricted through the orifice 125 and, therefore, pressure in the manifold chamber 40 will increase. This increase continues, even though the rotor speed is not increased, since the more the orifice 125 is restricted, the more the pressure in the manifold chamber 40 builds up and, therefore, the greater the pressure on the plunger 39 becomes until the motor begins to rotate.

The speed at which the bypass valve 41 closes is limited by the dashpot effect of the fluid in a chamber 130 being expelled therefrom through an orifice 131. The manifold chamber 40 will continue to be under pressure whether the load attached to the motor rotor is coasting, braking, or accelerating and regardless of whether the pump chamber ring is shifted to forward or reverse.

A plunger return spring 42 which forces the bypass valve 41 open is of such strength as to keep the bypass valve 41 open when the engine is idling and the pump is discharging a very small amount of fluid; however, when the engine speed is increased at all above a low idle, the pressure plunger 39 will begin its downward travel, closing the bypass valve 41 slightly. The lower end of the pressure plunger 39 has a piston 135 which, with the plunger return spring 42, operates in the cylindrical chamber 130 which is almost filled with fluid. Fluid may pass directly from the left main channel 30 through the bypass valve 41 to the right main channel 31 when the pump rotor is turning very slowly; that is, when the engine is idling. At such time, pressure at the upper end of the plunger 39 is very low so that the orifice 125 is lined up with the channels 126 and 127. If the engine speed increases, the volume flow of fluid through the bypass valve 41 will increase and pressure will increase at the upper end of the pressure plunger 39 due to the inability of the bypass valve 41 to carry such increased flow. The plunger 39 will then be pushed down slowly against the pressure of the plunger return spring 42 as the piston 135 compresses the spring 42 and as the fluid is expelled through the orifice 131.

As a result of this initial partial closure of the bypass valve 41, the increased pump speed will cause a further increase in pressure in the primary system and, hence, in the manifold chamber 40, resulting in further closure of the bypass valve 41 so that once the process of closure is begun, it is self-inducing. At the same time, fluid is expelled from the spring chamber 130 through the dashpot orifice 131. This will insure smooth and complete closing of the bypass valve 41 and smooth initial acceleration of the load as the orifice 125 moves out of alignment with the channels 126 and 127 since the bypass valve system is both self-actuating and self-retarding. Thus, fluid will then be directly driven through the left main channel 30 to the motor rotor and back through the right main channel 31 and the load will be moved.

*Fluid passages*

The left main channel 30 is connected through a bleeder orifice 37a to a passage 99 and through the lower pump control chamber vent 28b to the lower pump control chamber 20. Also, the left main channel 30 is connected through a check valve 36a to the passage 99 which is directly connected to the metering pump 43. The check valves 36a and 36b will allow flow of fluid only in the direction indicated. The right main channel 31 is connected through a bleeder orifice 37b and also through the check valve 36b to the upper pump control chamber 19 through the vent 28a and, also, to the lower motor control chamber 22 through a lower motor control chamber vent 28d. An overdrive orifice 29 lies between the vents 28d and 28c in a passage 34 which connects the vents 28d, 28a, and 28c to the metering pump 43. The overdrive orifice 29 will be large enough that it will not impose substantial resistance to the flow of fluid passing therethrough until the volume of fluid therethrough is great; that is, until the metering pump 43 has obtained a high speed of rotation. When the motor rotor is rotating very slowly and the pump rotor is rotating clockwise, the fluid pressure in the left main channel 30 will be impressed in the lower pump control chamber, urging the bottom of the ring to incline toward the pump rotor. The check valve 36a will be unaffected.

The upper pump control chamber 19 and the lower motor control chamber 22 will always be at the same pressure since they are connected by the vents 28a and 28d. The upper motor control chamber 21 will also be at the same pressure as the upper pump control chamber 19 and the lower motor control chamber 22 at low motor speeds since the overdrive orifice 29 will be sufficiently large that no appreciable change in pressure will result across the overdrive orifice 29 at low to medium motor speeds. The orifice 37a will be bypassed by the check valve 36a when the right main channel 31 is at the pressure side.

For high motor speeds, a high flow of fluid will result through the overdrive orifice 29, resulting in an appreciable pressure change across it and causing an unbalance of pressures at the vents 28c and 28d, therefore urging the motor chamber ring to tilt downward for less output per revolution or overdrive position.

*Manual shift system*

In order for the pump rotor to displace fluid, the pump chamber ring must be tilted relative to the axis of the shaft 79. In order to provide this initial tilt to move the ring slightly off center, a shift rack 12 is provided. The shift rack 12 is straight and slidably mounted in a slot 58 in the pump stator. The ends of the shift rack 12 are slanted to facilitate sliding past the edges of the pump chamber ring and the edge engaging the ring extends out to overlie the ring and hold the rack 12 in position. The outwardly extending edges also constitute stops to limit the movement of the rack 12 when shifting.

When the shift rack 12 is shifted up as shown, the pump chamber ring will have its top tilted toward the pump rotor so that when the pump rotor is rotated clockwise, the left main channel 30 becomes the pressure side. If the shift rack 12 is shifted down, the bottom of the ring will move toward the rotor and the right main channel 31 will become the pressure side.

Shift system

To simplify the understanding of the shift system, when the pump and motor are rotating slowly or at medium speeds, the overdrive orifice 29 will be ineffective. The left main channel 30 is connected to the lower pump control chamber through the orifice 37a, check valve 36a, and vent 28b. Therefore, as long as the motor is at rest, the total pressure in the left main channel 30 is impressed in the lower pump control chamber 20 through the orifice 37a. This pressure urges the top of the pump chamber ring to swing toward the sections 1 and 2. The pressure on the working surface of the chamber ring from the pump rotor is in a direction to force the ring down. At the same time, the pressure in the right main channel 31 is reduced by the pump drawing fluid therefrom. This reduced pressure is imposed in the upper pump control chamber 19. Since the pressure on the bottom working surface is greatest, the tendency of the pump chamber ring is to shift down, but since the pressure in the left main channel 30 is impressed on the lower pump control chamber 20, this tendency is overcome and the top of the ring shifts away from the pump rotor.

Therefore, the difference in pressure between the upper pump control chamber 19 and the lower pump control chamber 20 tends to urge the top of the pump chamber ring to swing away from the pump rotor. The pump chamber ring, therefore, moves to the position shown and the pump rotor displaces the minimum amount of fluid.

At the time the motor rotor is at rest, the pressure in the upper motor control chamber 21 and the lower motor control chamber 22 is equal since they are connected together through the overdrive orifice 29. The metering pump 43, being connected to the motor rotor, is also at rest. This pressure will be equal to the negative pressure in the right main channel 31 imposed thereon through the orifice 37b. Since the lower motor chamber ring stop 16b is larger than the upper motor chamber ring stop 16a, the motor chamber ring will always, to a greater or lesser extent, have its top inclined away from the pump rotor as shown. Therefore, when the pump rotor starts, the bypass valve 41 closes and a pressure builds up in the left main channel 30. The motor rotor then begins to rotate to allow fluid to flow back to the pump rotor through the right main channel 31.

When the motor rotor 6 starts, it starts the metering pump 43, the metering pump 43 being connected thereto. This begins to pump fluid from the left main channel 30 through the orifice 37a. This causes a change in pressure across the orifice 37a. This reduces the pressure in the lower pump control chamber 20 since the vent 28b connects the metering pump 43 thereto, and the reduction of the pressure which has been opposing the tendency of the pump chamber ring from swinging its top toward the rotor causes the pump rotor to pump more fluid per revolution.

As the motor rotor and the metering pump 43 driven thereby commence to rotate, they will force the fluid taken from the left main channel 30 through the overdrive orifice 29 and the check valve 36b. No substantial change will result in the control chambers 19, 21, and 22. Therefore, when the pump starts, it displaces minimum fluid per revolution but, as the motor in turn starts, the effect of the motor starting to rotate the metering pump 43 is to swing the pump chamber ring to a position to cause the pump 43 to displace more fluid per revolution. This effect is cumulative and as the motor speed increases, the pump chamber ring is further swung and the pump is caused to displace more and more fluid per revolution. The fluid returned to the pump by the motor per revolution thereof remains constant as long as the pressure drop across the overdrive orifice 29 is negligible.

If a higher torque is applied to the pump rotor as by applying full throttle to the prime mover driving the pump, the pressure in the left main chamber 30 will be greater and the net effect of swinging the pump chamber ring for greater displacement will be delayed.

Overdrive

Assuming an intermediate engine throttle setting, as the speed of rotation of the motor rotor further increases and, with it, the speed of the metering pump 43, the pressure difference across the overdrive orifice 29 becomes appreciable. Therefore, the pressure imposed in the upper motor control chamber 21 through the vent 28c becomes much greater than the pressure in the lower motor control chamber 22. Therefore, the chamber ring 11 will be urged to swing toward the stop 16b. This causes the motor rotor to displace less fluid per revolution and, therefore, rotate more revolutions for each revolution of the pump rotor, thereby giving an overdrive effect.

The diameter of the overdrive orifice 29 is preferably such that it will freely carry the discharge of the metering pump 43 up to a reactor speed of about fifty percent maximum. Above this speed, pressure difference across the overdrive orifice 29 increases and pressure begins to build up in the upper motor control chamber 21, tending to force the motor chamber ring downward through its path to the position of least displacement, thereby lowering the overall ratio of the transmission or, if the shifting of the pump chamber ring has already put the transmission in a 1-1 ratio, then the overdrive will raise the ratio in the opposite direction; for example, 1-1.5.

Underdrive

The underdrive feature which corresponds to the kick down or passing gear in conventional transmissions comes from the natural flexibility of the shift and overdrive systems. Assuming that the engine is not delivering its full torque to the transmission at some intermediate motor speed, the pressure in the pressure side of the primary circuit could be increased by applying full engine throttle since this would permit the engine to produce its maximum torque at that revolution per minute. Since the load and, therefore, the metering pump 43 will not react instantaneously, the pressure will increase in the left main channel 30 and the pressure will decrease in the right main channel 31 and a suction will be applied to the upper pump control chamber 19 through the vent 28a and the lower motor control chamber 22 through the vent 28d.

Since, at the same time, the higher pressure on the upper part of the motor chamber ring working surface is forcing the top of the motor chamber ring toward the pump and since fluid is being drawn from the lower motor control chamber 22 faster than the metering pump 43 can supply it to the upper motor control chamber 21 to maintain the pressure therein, the net effect will be a movement of the motor chamber ring downward to a position giving greater displacement per revolution of the motor. Since, due to the higher pressures in the left main channel 30, fluid tends to be forced into the lower pump control chamber 20 through the orifice 37a faster than the metering pump 43 can remove it and the pressure in the lower pump control chamber 20 increases, the tendency will be to shift the pump chamber ring to a position giving less displacement per revolution of the pump.

The tendency of the pump chamber ring toward shifting is not as great as the tendency of the motor chamber ring to shift due to the fact that whereas the motor is being "permitted" to displace more fluid (its natural tendency), the pump is being "forced" to pump less fluid (opposed to its natural tendency). The advantage of this feature is that when the desired motor speed is attained and the transmission pressures are allowed to return to normal operating pressures, the pump, having shifted less, will be in a better position to supply fluid at that speed when the motor again shifts into overdrive.

When the top of the pump chamber ring is given an initial tilt backward and upward by moving the shift rack 12 down, the pump chamber ring is moved to reverse position. In reverse, the same up shift will occur but the overdrive and underdrive will not function since, for automotive applications, speeds in reverse will not be great enough to make these two features desirable. In reverse, after the metering pump 43 starts, fluid is bled from the right main channel 31 through the other bleeder orifice 37b into the upper pump control chamber 19 where it is evacuated by the metering pump 43 through the overdrive orifice 29 and then released through the check valve 36a into the left main channel 30.

*Vane locking system*

The purpose of the vane locking system is to maintain a tight contact of the rotor blade extremities with the working surfaces of the chamber rings. This is accomplished by means of the bores or fluid passages 32 and 33 leading from the manifold chamber 40 to the centers of the rotors so that the pressure carried in the manifold chamber 40 is imparted to the bases of the vanes, forcing them out against the chamber rings. Together, they form a straight line segment lying at the axis of the transmission. The rear rotor vane locking passage 33 extends axially through the metering pump 43. The blade 92 of the metering pump 43 is subjected to pressure from the passage 33 and it is urged outwardly to form sealing engagement with the inside of its chamber.

*Reversing system*

In order to cause the direction of rotation of the motor to reverse for a given direction of rotation of the pump rotor, the shift rack 12 is moved down to give the bottom of the pump chamber ring 10 an initial tilt toward the pump rotor 5. The shift rack 12 is actuated by any handle or other conventional method desired. Preferably, however, it is actuated by connection to another separate functional member. A shift rod 8 lies between the center plate sections 3 and 4 and has at its lower end a foot 59 which projects forward to engage a notch in the shift rack 12. The shift rack 12 is rectangular in cross section and lies in the vertical slot 58 in the front center plate section 3 and is bevelled at each end where its slot opens into the upper and lower pump control chambers 19 and 20, respectively. When, through the action of the shift rod 8, the shift rack 12 moves up or down, its bevelled end surface strikes the rearmost edge of the pump chamber ring 10 and moves it very slightly off center. Thus, when the shift rack 12 is raised, it will shift the top of the pump chamber ring 10 toward the pump rotor 5 for forward and when the shift rack 12 is lowered, it will shift the top of the pump chamber ring 10 away from the pump rotor 5 for reverse. For neutral drive position, the shift rod 8 and the shift rack 12 will be moved to a position between their high and low limits.

*Interlock system*

The purpose of the interlock system is to help prevent accidental movement of the shift rod 8 while the vehicle is in motion. The interlock system consists of a passage 38 leading from the manifold chamber 40 to a space 140 within which the foot 59 of the shift rod 8 moves. The manifold chamber pressure reacts on the foot 59. When the rod 8 is raised, fluid is forced in under it and when it is lowered, fluid is forced in above the foot 59 in the space which will be defined above it when it moves down.

*Chamber ring having roller bearings*

Figure 17:
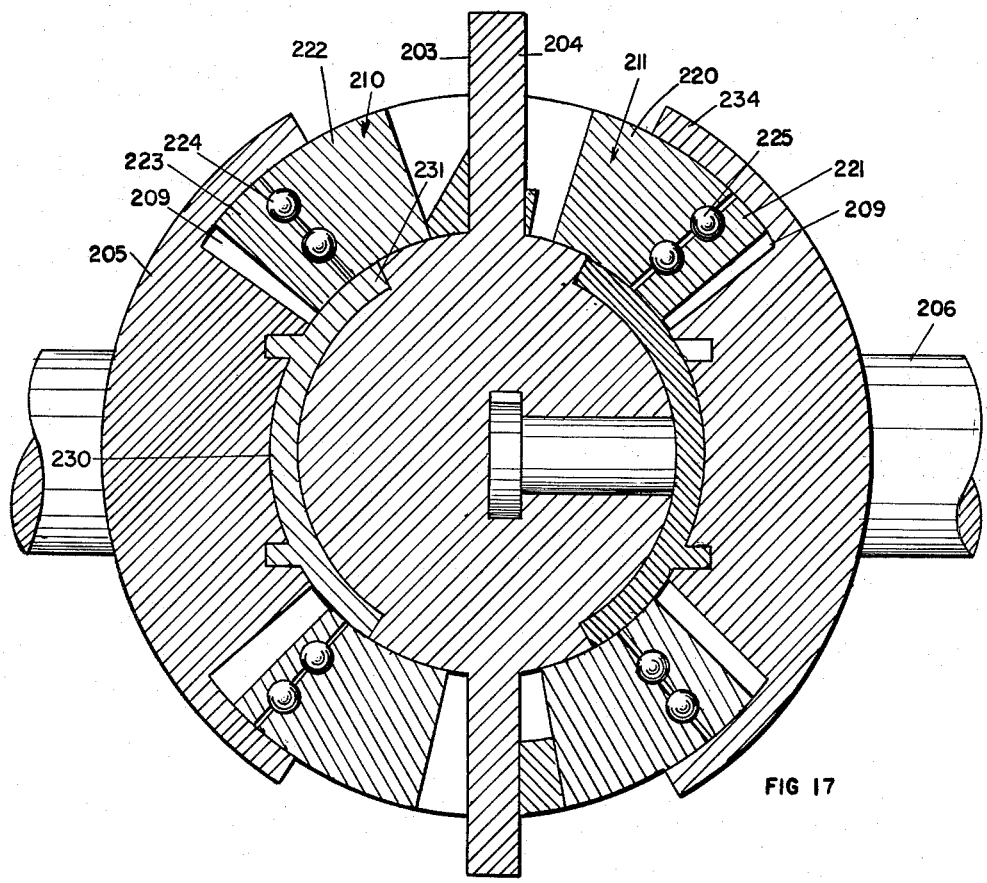
Fig. 17 is a view of another embodiment of a chamber ring.

In Fig. 17, another embodiment of the chamber ring and rotor structure is shown. Rotors 205 and 206 of the pump and motor, respectively, are disposed inside a casing 201 which is very similar to that shown in the other embodiment of the invention. Center plates 203 and 204 support stator elements similar to those shown in the other embodiment of the invention. Chamber rings 210 and 211 are similar to those shown in the other figures of drawings; however, the chamber rings 210 and 211 are made in two parts 220 and 221 in the case of the motor chamber ring and parts 222 and 223 in the case of the pump chamber ring. The chamber rings 210 and 211 have bearing ways formed on their opposing sides which receive ball bearings 224 and 225 in the chamber rings 210 and 211, respectively. Therefore, the frictional force between blades 109 of the pump rotor and similar blades 209 of the motor rotor against the chamber ring working surface may be relieved by the relative movement and rolling friction between the balls and the two respective parts 222 and 223 on the chamber ring.

In order to make the two halves of the stator sphere identical, a flange 230 is inset in a groove 231 in the pump stator which extends under the underside of the pump chamber ring 210 and the outer portion of the pump rotor at 233 is designed to overlie the outer portion 223 of the pump chamber ring. The corresponding side 234 of the motor rotor overlies the outer portion of the motor chamber ring.

The other parts of the embodiment of the invention shown in Fig. 17 are similar to the other embodiment shown.

The foregoing specification sets forth the invention in its preferred practical forms but the structure shown is capable of modification within a range of equivalents without departing from the invention which is to be understood to be as broadly novel as is commensurate with the appended claims.

The embodiments of the invention in which an exclusive property or privilege is claimed are defined as follows:

1. A transmission comprising a casing having a first and a second hemispherical shaped surface and defining a pump chamber and a motor chamber, respectively, a pump member in said pump chamber, a rotor in said motor chamber, driving means attached to said pump member and driven means attached to said rotor, a pump chamber ring having an outside surface engaging said first hemispherical surface, said pump member having vane means and means urging one surface of said vane means into engagement with said first hemispherical surface and another portion of said vane means into engagement with said pump chamber ring, channel means connecting said pump chamber to said motor chamber, means on said rotor engaged by fluid pumped from said pump member through said channel means whereby said rotor is driven, and means having a third hemispherical surface disposed in said transmission generally concentric to said first hemispherical surface, said pump vane means engaging said third hemispherical surface; said first hemispherical surface, said third hemispherical surface, said pump member, said vane means, and said pump chamber ring forming a plurality of closed chambers on one side of said ring; and means to swing said ring about a diameter thereof to vary the size of said chambers as said pump member rotates whereby fluid is forced from said pump member through said channel means to said motor chamber.

2. The transmission recited in claim 1 wherein a motor chamber ring is disposed in said motor chamber, means for swinging said motor ring about a diameter thereof to vary the fluid displaced by said rotor during each rotation thereof, and means to return fluid from said rotor to said pump member.

3. The transmission recited in claim 2 wherein a metering pump is provided, means connecting the output from said metering pump to a chamber in said transmission defined by a side of said pump chamber ring remote from said pump member, said metering pump forcing fluid into engagement with said pump ring whereby the amount said pump chamber ring is swung about its said diameter is controlled.

References Cited in the file of this patent

UNITED STATES PATENTS

| | | |
|---|---|---|
| 2,074,618 | Roeder | Mar. 23, 1937 |
| 2,401,376 | Sherman | June 4, 1946 |
| 2,783,614 | Blair | Mar. 5, 1957 |
| 2,821,928 | Wagner | Feb. 4, 1958 |
| 2,832,198 | Pichon | Apr. 29, 1958 |

FOREIGN PATENTS

| | | |
|---|---|---|
| 256,687 | Germany | Feb. 19, 1913 |